Sept. 29, 1970   P. REICHBORN-KJENNERUD   3,530,576
METAL BAND CUTTER
Filed Oct. 25, 1967
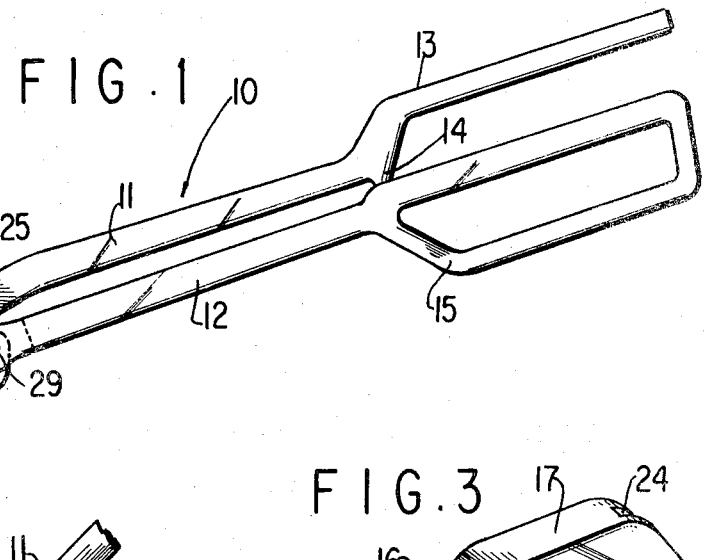
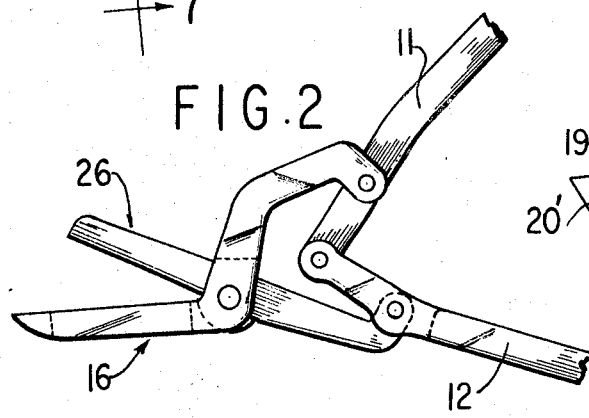
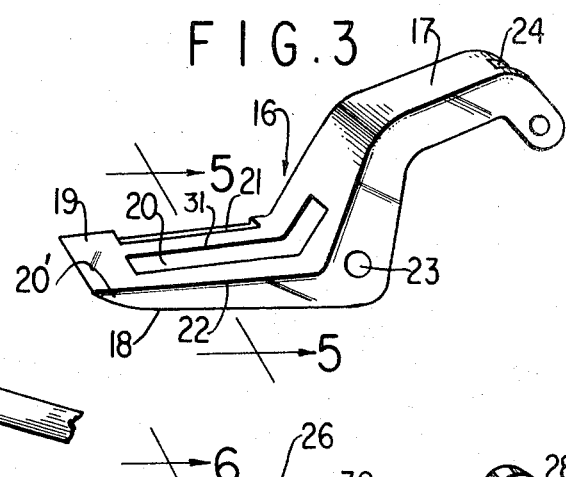
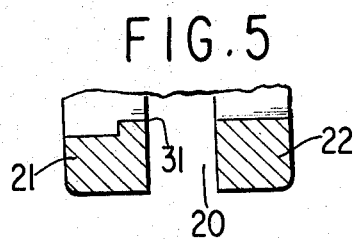
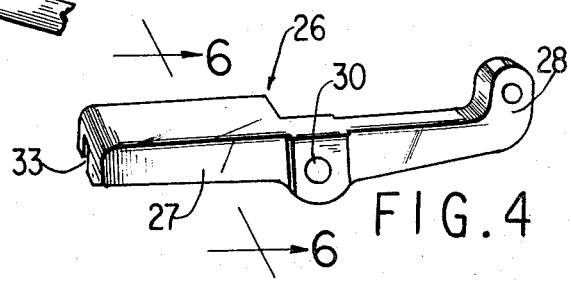
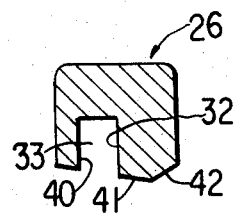
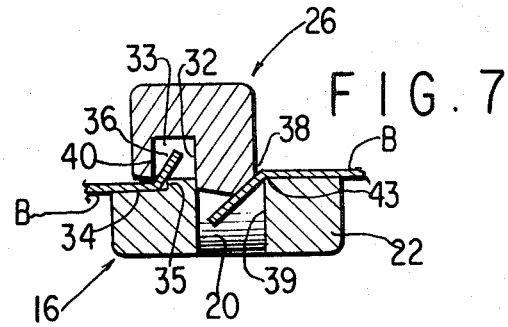
INVENTOR
PER REICHBORN-KJENNERUD
BY
Smythe & Moore
ATTORNEYS

United States Patent Office 3,530,576
Patented Sept. 29, 1970

3,530,576
METAL BAND CUTTER
Per Reichborn-Kjennerud, Staten Island, N.Y., assignor to Goodway Tools Corporation, New York, N.Y., a corporation of New York
Filed Oct. 25, 1967, Ser. No. 678,101
Int. Cl. B26b 13/12, 17/02
U.S. Cl. 30—134                                    1 Claim

ABSTRACT OF THE DISCLOSURE

A metal band cutter having an anvil member coacting with an integral cutting and gripping blade member with these members being pivotally connected together intermediate their ends and the corresponding ends of said members are each pivotally connected to respective handles. The corresponding one ends of the handles are also pivotally connected and the pivotal connections between the handles and the members are adjacent the handle pivotal connection.

---

The present invention relates to metal band cutting tools, and more particularly, to an improved band cutting and gripping tool of simple construction provided with a leverage arrangement which increases the cutting and gripping force which can be exerted when the operating handles are manually squeezed together.

Metal straps have been widely employed in a variety of industries to bind various forms of packages and materials. These metal bands are placed under substantial tension when applied to bind crates, cartons, containers, packages, bundles or tubing or piping, lumber, bricks, paper, and many other bulk materials for shipping purposes. When the shipped material or container reaches its destination, the bands must be removed to permit the unloading of the container or package of materials. Since these metal bands are under considerable tension, when the bands are cut the free ends frequently fly apart and have been known to injure nearby personnel or to damage adjacent objects. Many forms of cutters have been devised to cut the metal bands. While no problems are presented in cutting the bands, a problem arises in gripping the cut portions of the bands during the cutting operation so that the cut ends do not spring loose. Accordingly, many forms of cutters have been devised which have a band gripping structure incorporated therein. Such cutters with gripping structures have generally proved to be unsatisfactory since they generally embody complicated structure which requires frequent maintenance, the cutters are costly to manufacture, or excessive forces must be exerted to grip properly the metal band prior to and during the cutting operation.

One of the objects of the present invention is to provide an improved metal band cutting tool which effectively grips the cut band ends prior to and during the cutting operation.

Another of the objects of the present invention is to provide a metal band cutting and gripping tool which is simple in structure, relatively inexpensive to manufacture and is capable of long maintenance-free operation.

A still further object of the present invention is to provide a metal band cutting and gripping tool which requires a minimum of force to grip effectively the band prior to and during the cutting operation.

In one aspect of the present invention, the metal band cutter may comprise first and second handles which are pivotally connected together on their corresponding one ends. There is an anvil member which has one end pivotally connected to a first handle adjacent the handle pivotal connection and the other end of the anvil member has a substantially flat upper face. The anvil member is provided with a centrally arranged elongated slot which forms spaced parallel bars with the bars being joined at both ends thereof. One of the anvil member bars is provided with means for defining a band cutting surface and a band gripping flange. A pin extends across the anvil member slot. A second member is provided which has a blade portion on one end thereof for cooperation with the anvil member slot portion. The other end of the second member is pivotally connected to the second handle adjacent the handle pivotal connection. The second member is also pivotally mounted on the pin extending across the anvil member slot so as to form a pivotal connection with the anvil member. The second member blade portion is provided with means which forms a band gripping flange and a band cutting edge. The second member cutting edge is movable into the anvil member slot so that the respective gripping flanges and cutting edges of the pivotally connected members coact with each other. When the blade portion progressively cuts across a metal band a severed portion of the band is bent downwardly by the coacting cutting edges and the other severed portion of the band is progressively gripped between the coacting gripping flanges.

Other objects, advantages and features of the present invention will become apparent from the accompanying description and drawings which are merely exemplary.

In the drawings:

FIG. 1 is a side elevational view of the metal band cutter incorporating the present invention;

FIG. 2 is a view similar to that of FIG. 1 but only of the blade portion end of the cutter showing the blades in an open position;

FIG. 3 is a perspective view of one of the blades of the cutter;

FIG. 4 is a perspective view of the other blade of the cutter;

FIG. 5 is a sectional view taken along the line 5—5 of FIG. 3;

FIG. 6 is a sectional view taken along the line 6—6 of FIG. 4; and

FIG. 7 is a sectional view in enlarged scale taken across the line 7—7 of FIG. 1 and showing the interaction between the blades during the cutting of a metal band.

Proceeding next to the drawings wherein like reference symbols indicate the same parts throughout the various views, a specific embodiment of the present invention will be described in detail.

As may be seen in FIG. 1, the metal band cutter according to the present invention is indicated generally at 10 and comprises a first handle 11 and a second handle 12 which are pivotally connected together at corresponding ends by a pin 12A which forms the pivotal connection. The handle 11 includes a gripping or operating portion 13 and an abutment 14 which engages the opposing surface of an operating or gripping handle portion 15 of handle 12.

The cutting portion of the cutter comprises an anvil member 16 illustrated in FIG. 3 having a curved portion 17 and a straight portion 18 which are integrally connected as shown in the drawings. The straight portion 18 has a substantially flat upper face 19 and there is an elongated slot 20 passing through the flat portion and extending into a part of curved portion 17 to define two bars 21 and 22. A pivot pin 23 passes through slot 20 at substantially the intersection of the straight and curved portions of the anvil member. The outer or extreme end of the curved portion is formed with an elongated slot 24 into which is received handle 11. The handle 11 and anvil member 16 are pivotally connected at 25.

The slot 20 does not extend to the forward end of anvil 16 and the bars 21 and 22 are connected at the forward end of anvil 16 by an integral portion 20'.

A second member or blade is indicated generally at 26 in FIG. 4 and comprises a substantially straight portion 27 having an upturned inner end 28 which is pivotally connected to handle 12 at 29. The blade 26 is provided with an intermediate opening 30 which receives pin 23 to form a pivotal connection between anvil 16 and the blade 26.

Anvil member 16 is provided with a cutting surface 31 formed on the bar 21 and which cooperates with a cutting surface 32 of a slot 33 formed in the blade 26. The cutting edge side of anvil member 16 is provided with surfaces 34 and 35 which cooperate with the slot 33 to progressively hold the severed edge 36 of the metal band as it is cut. In this construction, slots 20 and 33 can be cut with an ordinary milling machine cutter or the like. The slot 33 is made somewhat wider than the flange 37. The distance of the edge 38 from wall 39 and of edge 40 from wall 35 will largely depend upon the thickness of the metal band which is being cut. The band is indicated at B.

The blade 26, as may be seen in FIG. 6 is provided with surfaces 41 and 42 extending transversely from the cutting surface 32. The surfaces 41 and 42 thus can bend the portion of the band B downwardly between the bars 21 and 22 about the point 43 of bar 22 as the cutting action proceeds transversely across band B. When the band B is finally severed, the free end of band B is prevented from flying upwardly. The other end of the band is gripped between surface 34 and 35 by the surface 40 on blade 26.

From the above description it will be evident that as the cut proceeds transversely across the band, one severed edge of the band will be forced downwardly between the parallel bars on the anvil and the other severed edge will be forced upwardly into a slot formed in the blade 26. Since these bending operations occur from the very edge of the cutting and only after the cutting has occurred it is evident that a minimum of bending force is required. The leverage connection between the handles and the anvil and blade will insure that a maximum of the force applied to the gripping handles is employed for the actual severing action and for gripping both ends of the band after the band has been severed. Thus the metal cutting tool of the present invention not only insures that both severed ends of the band are securely gripped during the cutting operation but that this gripping and cutting action requires less force to be exerted on the operating handles than was previously thought to be necessary. Also, the linkage is arranged so that force applied along the cutting edges is substantially constant as the cut is made.

It should be apparent that the present invention is for a simple yet effective metal cutting and gripping tool which can be effectively operated with a minimum of force being exerted on the operating handles. An improved leverage arrangement is provided between the cutting portions and the handle portions so as to decrease the amount of force required to be exerted on the gripping handles to bring about a corresponding cutting and gripping force between the blade portions. The tool embodies a simple construction which requires a minimum of maintenance and which can be manufactured at a minimum of costs.

It will be understood that various details of construction and arrangement of parts may be made without departing from the spirit of the invention except as defined in the appended claim.

What is claimed is:

1. In a metal band cutter, first and second handles pivotally connected at the corresponding one ends thereof, an anvil member having a substantially flat upper face, a centrally arranged elongated slot extending through said anvil member and forming spaced parallel bars, said bars being joined at both ends, said anvil member slotted portion being substantially straight with an upwardly rearwardly and downwardly curved portion extending from one end thereof and the outer end of the curved portion being pivotally connected to said first handle at a point spaced from the pivotal end thereof, means on said anvil bars for defining a band cutting surface and a band gripping flange, a pin extending across said anvil member slot, a second member having a blade portion on one end thereof for cooperation with said anvil slot portion, said second member being substantially straight with an upward bend at its other end for pivotal connection to said second handle at a point spaced from the pivotal end thereof, said slotted blade portion being offset relative to the longitudinal axis of and extending upwardly into said anvil member curved portion, said second member being pivotally mounted on said pin to form a pivotal connection therewith, means on said second member blade portion for defining a hand cutting edge and a band gripping flange, said second member having a rectangular recess formed in the lower surface of and adjacent one side of the blade so as to be offset relative to the slot in the anvil, the recess in said blade forming a relatively narrow band gripping flange thereon, to one side thereof, and a relatively wide portion on the other side thereof, said wide portion being chamfered, an upstanding relatively narrow flange on one side of said anvil bars, said flange having a single cutting edge at one side thereof; said second member cutting edge being movable into said anvil member slot, whereby said gripping flanges and said cutting edges are in respective operating relation so that when said blade portion progressively cuts across a metal band by operation of said handles toward each other, a severed portion of said band is bent downwardly by the coacting cutting edges and the other severed portion of the band is progressively gripped between the coacting gripping flanges, said first and second handles being pivotally connected at their inner ends beyond the points of pivot with said anvil and second members, and the outer ends of said handles being offset to enable gripping and squeezing thereof during the cutting operation.

References Cited
UNITED STATES PATENTS

| | | | |
|---|---|---|---|
| 625,896 | 5/1899 | O'Dell | 30—252 |
| 835,900 | 11/1906 | Casterlin | 30—193 |
| 3,284,896 | 11/1966 | Reichborn-Kjennerid | 30—134 |

LESTER M. SWINGLE, Primary Examiner

J. C. PETERS, Assistant Examiner